United States Patent [19]

Chyung et al.

[11] Patent Number: 5,132,178

[45] Date of Patent: Jul. 21, 1992

[54] CERAMIC MATRIX COMPOSITES EXHIBITING HIGH INTERLAMINAR SHEAR STRENGTH

[75] Inventors: Kenneth Chyung, Painted Post; Kishor P. Gadkaree, Big Flats; Mark P. Taylor, Painted Post, all of N.Y.

[73] Assignee: Corning Incorporated, Corning, N.Y.

[21] Appl. No.: 47,128

[22] Filed: May 8, 1987

[51] Int. Cl.$^5$ .............................. D02G 3/00
[52] U.S. Cl. .................................. 428/372; 428/379; 428/384; 428/698; 428/699; 501/32; 501/88; 501/89; 501/95
[58] Field of Search ............... 428/379, 372, 698, 384, 428/699; 501/88, 89, 95, 32

[56] References Cited

U.S. PATENT DOCUMENTS

| | | | |
|---|---|---|---|
| 4,428,763 | 1/1984 | Layden | 264/125 X |
| 4,464,192 | 8/1984 | Layden et al. | 264/125 X |
| 4,485,179 | 11/1984 | Brennan | 428/902 |
| 4,543,345 | 9/1985 | Wei | 501/89 X |
| 4,615,987 | 10/1986 | Chyung et al. | 501/32 X |
| 4,626,515 | 12/1986 | Kishor et al. | 501/32 |

*Primary Examiner*—Stephen J. Lechert, Jr.
*Attorney, Agent, or Firm*—Kees van der Sterre

[57] ABSTRACT

Fiber-reinforced ceramic matrix composites incorporating a glass-ceramic matrix of lithium aluminosilicate composition in which is disposed a fiber reinforcement phase including at least one layer of unidirectionally oriented fibers (e.g. SiC), the matrix further comprising a whisker reinforcement phase selected from the group of SiC, alumina, HfC and $Si_3N_4$, the whiskers imparting substantially improved transverse modulus of rupture strength and interlaminar shear strength to the composite.

6 Claims, No Drawings

CERAMIC MATRIX COMPOSITES EXHIBITING HIGH INTERLAMINAR SHEAR STRENGTH

BACKGROUND OF THE INVENTION

The present invention relates generally to ceramic matrix composites, and more particularly to ceramic matrix composites reinforced with combinations of inorganic fibers and whiskers which exhibit enhanced interlaminar shear strength and other desirable properties.

The use of inorganic whiskers and fibers to reinforce glasses, glass-ceramics, and ceramics has long been practiced. In many references in the literature, whiskers have been characterized as relatively short, single-crystal fibers of small (less than 100 microns) diameter, while fibers are considered to be multicrystalline or amorphous and are generally sufficiently long to be used in woven or otherwise interlocking bundles, tows or cloth. Hence whiskers are typically incorporated as a randomly dispersed phase in a selected glass or ceramic matrix, while fibers are more frequently incorporated in a controlled oriented or interlocking alignment.

The mechanism of strengthening of glass or ceramic bodies by fibers is considered to be that of load transfer by the matrix to the fibers through shear. This load transfer shifts stress from the glass or ceramic matrix to the relatively long, high modulus fibers, while the fibers at the same time may act to impede crack propagation in the matrix material.

Whiskers are thought to impart strengthening by a similar mechanism, but load transfer to whiskers by the matrix is more limited due to the limited length and aspect ratio of the whiskers. Theoretically, a whisker which is sufficiently short will not be loaded to the breaking point by the matrix under stress, and therefore full advantage cannot be taken of the high strength of the whiskers.

Among the fibers and whiskers which have been suggested for use as reinforcement for nonmetal matrix materials are silicon carbide, silicon nitride, alumina and carbon whiskers. For example, U.S. Pat. No. 4,324,843 describes SiC fiber reinforced glass-ceramic composite bodies wherein the glass-ceramic matrix is of aluminosilicate composition. U.S. Pat. No. 4,464,475 describes similarly reinforced glass-ceramics comprising barium osumilite as the predominant crystal phase, while U.S. Pat. No. 4,464,192 describes whisker-reinforced glass-ceramic composites of aluminosilicate composition.

A principal objective of whisker reinforcement in ceramic and glass-ceramic materials for high temperature applications is that of increasing the toughness of the material. A toughened ceramic material exhibits improved resistance to cracking failure from flaws sustained in use, offering the possibility of increased fatigue lifetime.

For service at moderate temperatures, fiber and/or whisker-reinforced glasses can be utilized. As noted in U.S. Pat. No. 4,626,515, the addition of fiber reinforcement to glasses such as alkali-free alkaline earth aluminosilicate glasses can result in substantial strengthening, while whisker additions were found effective to enhance the toughness of the glass.

A combination of whiskers and fibers in one of the glasses described in the aforementioned patent, i.e., Corning Code 1723 aluminosilicate glass, resulted in an increase in the microcrack yield stress (MCY) of the glass. The microcrack yield stress of a glass or ceramic material is generally defined as the stress point at which microcrack defects begin to appear in the material. As the stress on the material increases above a certain level, a drop in the elastic modulus of the material is observed, manifested by the appearance of curvature in the normally linear stress-strain curve for the material. It was postulated but not demonstrated in U.S. Pat. No. 4,626,515 that the increase in MCY stress resulting from the combined presence of fibers and whiskers would enhance the transverse strength of the Code 1723 glass composite, thereby reducing fatigue and delamination effects.

In U.S. Pat. No. 4,615,987, a combination of fibers and whiskers was introduced into an anorthrite ($CaO-Al_2O_3-SiO_2$) glass-ceramic matrix and the effects on physical properties determined. Again the MCY stress was raised and similar effects on physical properties were postulated.

For ceramic matrix composites to be utilized in harsh, high-temperature environments, essential characteristics include not only high bending strength and fracture toughness, but also strength properties which are relatively isotropic, i.e., not confined to a single "strong" axis of the composite material. The attainment of such properties normally requires at least some cross-ply lamination of fiber reinforced laminae in the material since, as has been observed, whiskers alone cannot impart the necessary high isotropic modulus of rupture strength to the material. And, in fiber-reinforced ceramic matrix composite of uniaxial fiber orientation, transverse modulus of rupture strengths, i.e. strengths in bending about axes parallel to the fiber direction, are generally at least two orders of magnitude lower than strengths in bending across the fiber direction.

A further problem arising in the development of laminated ceramic matrix composites, including cross-ply laminates, is that of interlaminar shear strength. Stresses applied to the laminated structure in directions parallel to the planes of lamination give rise to shear stresses within interlaminar regions of the composite, which regions are not effectively fiber reinforced. These regions therefore exhibit relatively low strength and provide preferred paths for crack propagation, so that layer separation and delamination of the composite under stress can occur.

It is a principal object of the present invention to provide ceramic matrix composites which exhibit improved transverse modulus of rupture strengths and interlaminar shear strengths.

It is a further object of the invention to provide a method for improving the interlaminar shear strengths and transverse modulus of rupture strengths of fiber-reinforced ceramic matrix composites.

Other objects and advantages of the invention will become apparent from the following description.

SUMMARY OF THE INVENTION

The present invention provides fiber-reinforced ceramic matrix composites exhibiting enhanced physical properties, specifically including enhanced transverse modulus of rupture (flexural) strength and enhanced interlaminar shear strength. The fiber-reinforced composites are generally of laminar type, i.e., the fiber reinforcement is preferentially disposed in layers within the material, with the layers consisting of fiber groups or arrays wherein the fibers within each layer are principally disposed in substantially parallel alignment in a single direction, termed the fiber direction of the layer.

For the purpose of the present invention, transverse flexural strength refers to the modulus of rupture strength of a layer or multilayer sample of fiber reinforced ceramic matrix composite material such as above described as determined in flexure perpendicular to the fiber direction in the layer or sample. Interlaminar shear strength (ILSS) refers to the stress required to cause shear failure of the composite by delamination of laminar regions of the material in one or more planes parallel with the plane of fiber layers therein.

The invention provides a method for making laminar fiber-reinforced ceramic matrix composites which repeatedly provides products of enhanced transverse and interlaminar shear strength. Broadly stated, the method comprises first, providing a powdered glass matrix material for the fabrication of the composite. The matrix material will generally consist of a lithium aluminosilicate glass which is thermally crystallizable to a highly crystalline matrix material wherein beta-quartz and/or beta-spodumene constitute the principal crystal phase(s).

The powdered matrix material thus provided is combined with a compatible inorganic whisker reinforcement material in a proportion sufficient to provide the necessary enhancement of physical properties, but insufficient to objectionably degrade the consolidation characteristics of the matrix. Known reinforcement materials such as SiC, HfC, $Si_3N_4$ or alumina which are compatible with lithium aluminosilicate matrix materials can be used, and are most preferably added in a proportion providing a whisker concentration of about 5-25% by weight of the product. The step of combining the matrix powder and whiskers should be carried out so as to achieve thorough mixing of the powder and whiskers and thus the attainment of a homogeneous whisker-glass dispersion.

The next step of the process is to combine the homogeneous whisker-glass dispersion with the selected fiber reinforcement to form a fiber composite precursor. This precursor generally consists of fiber groups or arrays coated with the whisker-powder mixture or positioned within a whisker-powder mass so that the mass forms a matrix encasing the fibers. The fibers may consist of fibers known for use as ceramic matrix reinforcement fibers, such as silicon carbide, carbon, alumina, $B_4C$, BN, zircon, mullite, spinel or silicon nitride fibers. Preferably the fiber composite precursor will consist of multiple layers of substantially parallel powder-coated or powder-encased fibers suitable for providing a multilayer laminated composite material.

The fiber composite precursor thus provided is finally heated to effect consolidation thereof into a dense, substantially void-free ceramic matrix composite material. Consolidation may be achieved by sintering, hot pressing, hot isostatic pressing, or similar known consolidation procedures.

The product of the above-described process is a fiber-reinforced ceramic matrix composite exhibiting enhanced transverse flexural strength and enhanced interlaminar shear strength. The product is characterized by a highly crystalline, whisker-containing lithium aluminosilicate matrix constituting 30-85% of the volume of the product and a fibrous reinforcement material consisting of SiC or similar fibers making up the remaining 15-70% of the volume of the product. Beta-spodumene and/or beta-quartz crystals will constitute the principal lithium aluminosilicate crystals in the crystalline matrix. The whisker reinforcement phase present in the matrix will constitute 1-30% by weight of the fiber-reinforced composite, and will be composed of SiC or similar whiskers such as HfC, alumina or silicon nitride.

The fibers in the composite will be present in fiber arrays forming, for example, one or more fiber layers in the composite, each layer being characterized as unidirectional in that the fibers in the layer will all be oriented in substantially the same axial direction ($\pm 5°$). Multiple layers may, however, be disposed in cross-ply orientation with respect to each other in the composite.

The combined presence of the fibers and the whiskers in the composites of the invention provides substantial enhancements in transverse and interlaminar shear strength. Thus these composites are expected to provide significantly improved fatigue resistance and durability in prolonged high-temperature use.

DETAILED DESCRIPTION

The ceramic matrix materials used for composite fabrication in accordance with the present invention are glass-ceramic materials, meaning that they can be made and processed as glasses but can be transformed by thermal crystallization to ceramic materials which are substantially free of residual glass. The thermally crystallizable glasses employed constitute particularly preferred matrix materials because they consolidate readily (as glasses), but can exhibit an extremely high degree of crystallinity after thermal crystallization. Thus the crystallized matrix can exhibit high refractoriness and good creep resistance at high temperatures.

Glass-ceramic matrix materials having particular utility for composite fabrication in accordance with the invention comprise lithium aluminosilicate glass-ceramics, which are made from thermally crystallizable lithium aluminosilicate glasses treatable to develop one or more principal crystal phase(s) selected from the group consisting of beta spodumene and beta quartz therein. Such glasses will typically consist essentially, in weight percent on the oxide basis, of about 60-75% $SiO_2$, 15-25% $Al_2O_3$, 1-5% $Li_2O$, and 0-10% of a crystal nucleating agent selected from the group consisting of $ZrO_2$, $Nb_2O_5$, and $Ta_2O_5$. Additional optional constituents which may be present in these glasses include 0-10% MgO, 0-12% ZnO, 0-10% BaO, 0-5% $Cs_2O$, and 0-5% $As_2O_3$.

As is known from U.S. Pat. No. 4,485,179, $Nb_2O_5$ and/or $Ta_2O_5$ may be useful not only as nucleating agents but also to protect SiC fibers and/or whiskers from deterioration in use, perhaps by interacting with SiC to form a protective reaction layer. Preferred matrix glasses in accordance with the invention will therefore comprise 1-10% total of $Ta_2O_5$ or $Nb_2O_5$. Similarly, the inclusion of 0.5-3% $As_2O_3$ is preferred since such may help to protect SiC whiskers and fibers from oxidation.

The preferred nucleating agent in these glasses is $ZrO_2$, which will normally be present at levels of 1-5%. The nucleating agent $TiO_2$ is generally avoided in SiC-containing composites since this agent can interact deleteriously with SiC whiskers or fibers.

ZnO and/or MgO are frequently employed in the glass where a beta-quartz crystal phase is to be developed. Other alkaline earth metal oxides such as BaO may also be present, and in some cases alkali metal oxides such as $Cs_2O$ may be present, although for best refractoriness the glasses will be kept substantially free of $Na_2O$ and $K_2O$.

Powdered glass having the selected composition for the matrix can be prepared by essentially any technique which will produce complete pulverization with a uniform particle size. A preferred procedure is to produce coarse powdered glass by a technique such as dry-gaging, and then to mill the powdered glass, as by ballmilling, to produce very fine, uniform powder. Preferably the milled glass particles will not exceed 325 mesh (U.S. Sieve) in size, and will have an average particle size not exceeding 50 microns.

While any of the known whisker materials can be utilized to provide the necessary whisker reinforcement for the composites of the invention, the preferred whisker additive consists of SiC whiskers. These are commercially available, strong, and highly refractory so that they remain useful in high temperature environments.

Uniform dispersion of the whisker reinforcement in the glass matrix material is most conveniently accomplished in a liquid medium. Hence, both the whiskers and the glass powder are combined with a suitable liquid vehicle and the resulting paste or slurry is homogenized by blending, milling, or mulling the mixture. Any suitable vehicle system, optionally containing binders or other processing aids may be used, representative vehicles including water, water-alcohol mixtures, alcohols, and oils. The preferred vehicle system is a water-alcohol system which can readily be volatilized from the whisker-powder mixture after blending or further processing.

Although the fiber reinforcement material selected for use in making the fiber composite preform may consist of any of the known fibers such as carbon, alumina, mullite or the like, the presently preferred fiber reinforcement is SiC fiber. Again, SiC fiber is readily available commercially and exhibits the high strength and refractoriness needed for high temperature use.

The fabrication of a fiber composite preform from the selected fibers and powder-whisker mixture can be by casting, coating and laminating, coating and winding, or other known technique. The preferred practice, however, is to coat or impregnate fibers or a fiber yarn with a liquid slurry or suspension of the glass powder-whisker mixture, and then to lay up the impregnated fiber material by winding or other suitable process.

Drying, followed by binder burnout if needed, and then consolidation of a fiber composite preform produced as above described may be carried out using processing conventional for ceramic matrix fiber composites incorporating glass-ceramic matrix materials. Most preferably, consolidation will be carried out after the complete removal of water and organic species from the preform, but prior to crystallization of the glass, employing a hot-pressing step to insure removal of voids from the composite preform. The effective viscosity of the powdered glass phase is increased somewhat due to the presence of the whiskers therein, and hot-pressing is effective to promote complete consolidation notwithstanding the presence of these whiskers.

The following illustrative example sets forth a generalized procedure for providing a fiber-reinforced ceramic matrix composite sheet in accordance with the invention utilizing a thermally crystallizable lithium aluminosilicate glass to provide the matrix.

EXAMPLE

A batch for a thermally crystallizable lithium aluminosilicate glass is compounded for melting, the batch having a composition providing a glass melt consisting essentially, in parts by weight, of about 66.3 $SiO_2$, 19.3 $Al_2O_3$, 2.7 $Li_2O$, 2.7 $MgO$, 1.0 $BaO$, 2.0 $ZrO_2$, 5.0 $Nb_2O_5$, and 1.0 $As_2O_3$. The batch is ball-milled to assure glass homogeneity and melted in a platinum crucible at 1650° C. for 16 hours, after which the molten glass is dry-gaged by running into water to form finely divided glass particles. After drying, the particulate glass is ballmilled to provide glass powder having an average particle size of about 10 microns and screened to insure a maximum particle size of 100 mesh U.S. Standard Sieve.

A glass powder-whisker mixture is next prepared from the glass powder thus provided. A dispersion of SiC whiskers in a water-alcohol vehicle is produced by adding about 1 gram of whiskers to a vehicle consisting of 25 ml. distilled water and 75 ml. isopropanol. Thorough dispersion of the whiskers in the vehicle is achieved by high speed blending of the mixture for five minutes. Thereafter, 9 grams of the glass powder is added with blending being continued for another five minutes. Finally the solids are removed from the vehicle by filtration and dried to provide a homogeneous glass-powder mixture. The process is repeated to provide additional quantities of the mixture A slurry is next prepared from the glass powder-whisker mixture made as described. A quantity of the mixture sufficient to provide a flowable slurry is added to a water-alcohol vehicle consisting of 92.5 parts isopropanol, 7.5 parts distilled water and 6 parts of a polyvinyl acetate binder by weight, with high speed blending of the mixture to achieve a homogeneous suspension.

A yarn of continuous SiC fiber is next coated with this slurry. A strand of the yarn is passed through a flame to remove sizing and other combustible impurities, and is then transported through the slurry to thoroughly coat and impregnate the yarn with the whisker-powder mixture. The coated yarn is then wound around a rotating drum to form a sheet (prepreg) having a unidirectional fiber orientation. After drying, this sheet is cut from the drum to provide a green prepreg mat comprising unidirectional fibers coated with the whisker-glass powder mixture.

To provide a consolidated ceramic matrix composite sheet product from the thus-prepared prepreg mat, rectangular sections approximately 10 cm × 10 cm in size are cut from the mat, and 12 such sections are stacked in uniaxial (fiber parallel) alignment to provide a multilayer preform. This preform is then heated to 450° C. in a forced air oven to substantially remove the organic constituents therefrom.

Consolidation of the preform thus provided to a fiber composite sheet is finally achieved by hot-pressing the preform in a graphite mold under a nitrogen atmosphere in a resistance heated press at 1000–2000 psi. The temperature of the sample is gradually raised to 1300 1400° C., and is maintained at that temperature for 10 minutes. This treatment is effective to sinter the glass into a substantially void-free matrix and to crystallize the glass to a glass-ceramic material comprising beta-spodumene crystals as the predominant crystal phase.

The composite ceramic plate thus provided, having a thickness of about 0.4 cm and a density of about 2.54 gm/cm³, is tested for flexural strength (parallel with the fiber axis), for transverse flexural strength, and for interlaminar shear strength. Samples approximately 0.4 cm ×7 cm in size are cut from the plate for testing, with flexural strengths being determined in 4-point bending and interlaminar shear strength by a standardized short beam shear test in accordance with ASTM D2344-84.

Tested along with the above samples are comparative fiber-reinforced samples of corresponding size, made by the process of the Example and incorporating an identical lithium aluminosilicate glass matrix material, but omitting the SiC whiskers and whisker dispersion processing steps. Hence, the milled glass powder is simply incorporated directly into the alcohol-water-binder vehicle for fiber yarn coating. In both sample types the fiber reinforcement constitutes about 40% by volume of the composite material.

Table I below reports the results of the comparative testing of the two types of composites. Included in Table I for each of the two types of samples tested are: an identification of the matrix glass, an indication of the reinforcing fiber content in volume percent, the whisker content of the whisker-containing samples, the densities of the two samples, flexural strength values, transverse flexural strength values, and interlaminar shear strength (ILSS) values for the samples. The reported transverse flexural strengths are average values based on the testing of 5 samples.

TABLE I

| Sample No. | 1 | 2 |
|---|---|---|
| Matrix | whisker-containing $Li_2O$—$Al_2O_3$—$SiO_2$ glass-ceramic | $Li_2O$—$Al_2O_3$—$SiO_2$ glass-ceramic |
| Fiber | 40% (vol.) SiC | 40% (vol.) SiC |
| Whisker Content | 10% (wt.) SiC | none |
| Density (g/cm³) | 2.54 | 2.50 |
| Flexural Strength (ksi) | 108 | 120 |
| Transverse Flexural Strength (psi) | 3,670 | 1,310 |
| ILSS (psi) | 9,868 | 5,608 |

As the strength data in Table I indicate, substantial increases in both interlaminar shear strength (an increase of 76%) and transverse flexural strength (an increase of 280%) are observed in lithium aluminosilicate matrix fiber composites when an added whisker phase is present.

As previously noted, a relatively broad range of thermally crystallizable lithium aluminosilicate glass compositions may be employed to provide a crystallized lithium aluminosilicate matrix for a whisker-fiber composite in accordance with the invention. Specific examples of such compositions are reported below in Table III. Included in Table III along with illustrative matrix compositions are proportions of whisker additions and fiber reinforcement which would be expected to provide enhancements in transverse flexural and interlaminar shear strengths similar to those reported for the illustrative lithium aluminosilicate composite of the Example. Also reported for each matrix composition is a description of the consolidation conditions (temperature and pressure) suitable for providing a high-density fiber composite incorporating the indicated matrix, and an indication of the principal crystal phase or phases developed in glass of the reported composition during the indicated consolidation treatment.

TABLE III

Lithium Aluminosilicate Whisker-Fiber Composites

| Composition | 2 | 3 | 4 | 5 |
|---|---|---|---|---|
| $SiO_2$ | 63.4 | 61.6 | 69.6 | 68.5 |
| $Al_2O_3$ | 20.5 | 22.7 | 17.7 | 20.0 |
| $Li_2O$ | 1.5 | 2.1 | 3.0 | 2.9 |
| MgO | 0.9 | 4.1 | 2.7 | 2.6 |
| BaO | — | 3.0 | 1.0 | — |
| ZnO | 10.4 | — | — | — |
| $ZrO_2$ | — | 2.5 | 2.0 | 2.0 |
| $Cs_2O$ | 3.25 | — | — | — |
| $Nb_2O_5$ | — | 3.0 | 3.0 | 3.0 |
| $As_2O_3$ | — | 1.0 | 1.0 | 1.0 |
| Whisker Additive (% wt) | 10% SiC | 10% SiC | 10% SiC | 10% SiC |
| Fiber Content (% vol.) | 40% SiC | 40% SiC | 40% SiC | 40% SiC |
| Consolidation Conditions (°C., psi) | 1000° C. 1000 psi | 1300° C. 1500 psi | 1300° C. 1500 psi | 1300° C. 1500 psi |
| Principal Matrix Phase(s) | β-quartz s.s. | β-spodumene s.s. | β-spodumene s.s. | β-spodumene s.s. |

Of course the foregoing examples of the invention are merely illustration of the compositions and processes which maybe resorted to within the scope of the invention as defined by the appended claims.

We claim:

1. A fiber-reinforced ceramic matrix composite article exhibiting enhanced transverse strength and interlaminar shear strength which consists essentially of a fiber reinforcement phase making up 30-85% by volume of the article and a ceramic matrix phase making up 50-70% by volume of the article, wherein
   (a) the ceramic matrix phase comprises an inorganic whisker phase homogeneously dispersed therein and constituting 1-30% by weight of the article,
   (b) the ceramic matrix phase further comprises a matrix material consisting essentially of a lithium alumino-silicate crystal phase selected from the group consisting of β-quartz and β-sodumene; and
   (c) the fiber reinforcement phase comprises at least one layer of fiber reinforcement wherein the fibers are unidirectionally oriented;
   said composite article exhibiting a transverse flexural strength of at least about 3670 psi and an interlaminer shear strength of at least about 9869 psi.

2. A fiber-reinforced ceramic matrix composite article in accordance with claim 1 wherein the inorganic whisker phase consists of whiskers selected from the group consisting of SiC, alumina, HfC and silicon nitride.

3. A fiber-reinforced ceramic matrix composite article in accordance with claim 2 wherein the inorganic whisker phase consists of SiC whiskers and constitutes 5-25% by weight of the article.

4. A fiber-reinforced ceramic matrix composite in accordance with claim 3 wherein the fibrous reinforcement phase consists of SiC fibers.

5. A fiber-reinforced ceramic matrix composite in accordance with claim 4 wherein the ceramic matrix phase has an oxide composition, in weight percent, of about 60-75% $SiO_2$, 15-25% A $Li_2O$, 0-10% of oxides selected from the group consisting $ZrO_2$, $Nb_2O_5$ and $Ta_2O_5$, 0-10% MgO, 0-12% ZnO, 0-10% BaO, 0-5% $Cs_2O$, and 0-5% $As_2O_3$.

6. A fiber-reinforced ceramic matrix composite in accordance with claim 5 wherein the ceramic matrix phase comprises 1-10% total of $Nb_2O_5$+$Ta_2O_5$, 1-5% $ZrO_2$m and 0.5-3% $As_2O_3$.

* * * * *